March 10, 1925.
A. A. GLIDDEN ET AL
BATTERY BOX
Filed Sept. 19, 1922
1,529,124
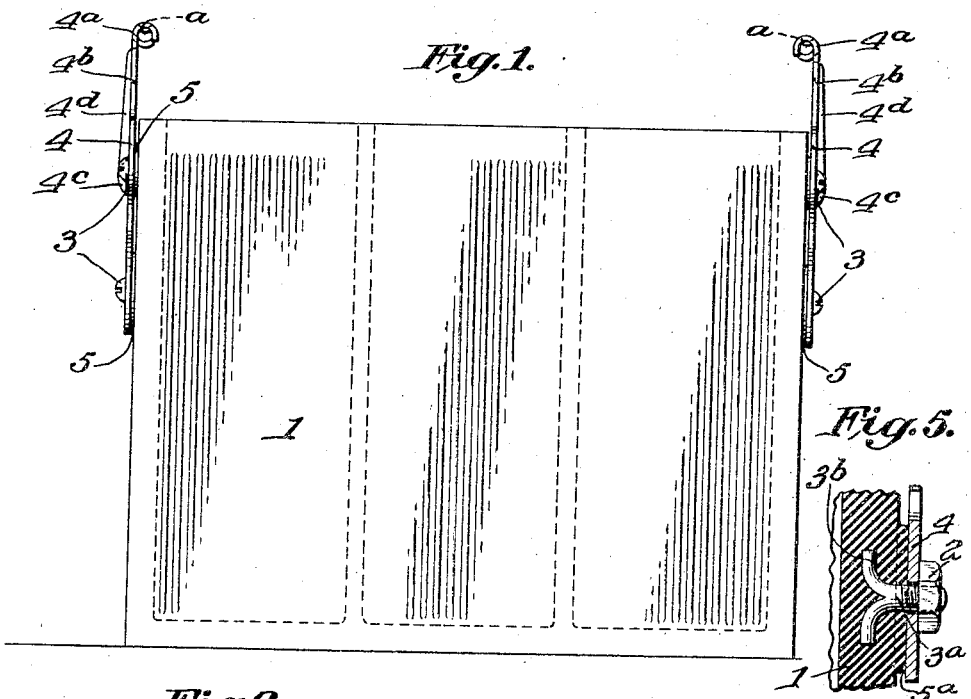
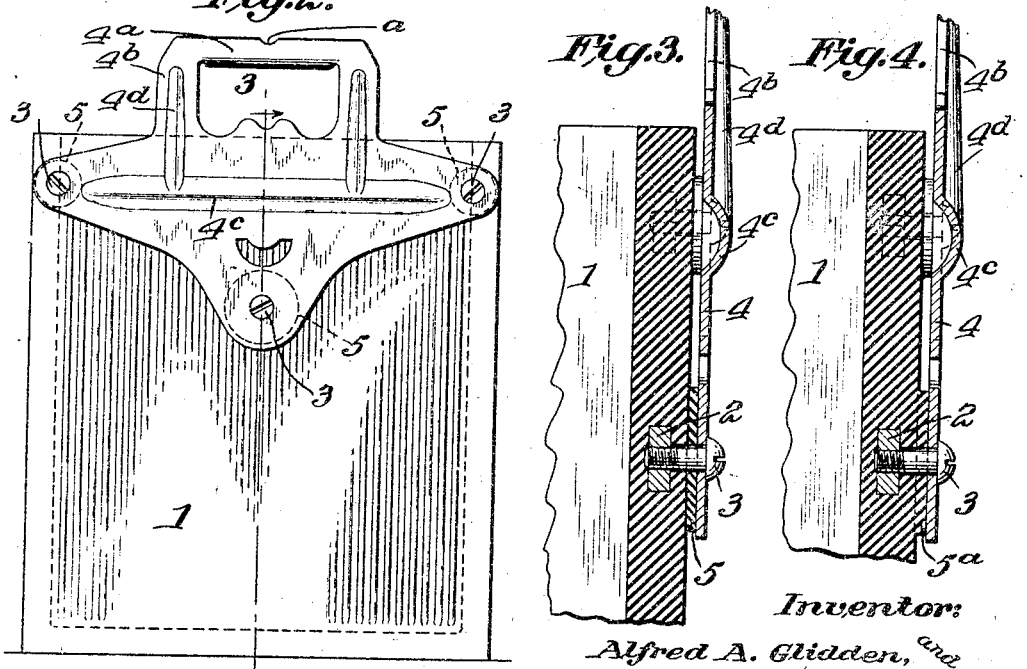
Inventor:
Alfred A. Glidden, and
Joseph E. Perrault,
by their Attys.

Patented Mar. 10, 1925.

1,529,124

UNITED STATES PATENT OFFICE.

ALFRED A. GLIDDEN AND JOSEPH E. PERRAULT, OF WATERTOWN, MASSACHUSETTS, ASSIGNORS TO HOOD RUBBER COMPANY, OF WATERTOWN, MASSACHUSETTS, A CORPORATION OF MASSACHUSETTS.

BATTERY BOX.

Application filed September 19, 1922. Serial No. 589,158.

*To all whom it may concern:*

Be it known that we, ALFRED A. GLIDDEN and JOSEPH E. PERRAULT, citizens of the United States, and residents of Watertown, in the county of Middlesex, in the State of Massachusetts, have invented certain new and useful Improvements in Battery Boxes, of which the following is a specification.

Our present invention relates to improvements in hard rubber battery boxes or jars of the type which are formed with a plurality of partitions forming cells for the active material, and more particularly to the improvements in the handle construction. These battery jars are now very extensively used in connection with starting, lighting and ignition systems of motor vehicles. Owing to the vibration and jolting to which the motor vehicles are subjected in service, it is necessary that the storage batteries should be firmly secured in place in the machine, and owing to the weight of the batteries, handles must be provided for lifting them when necessary, and it is the custom to apply the clamping means for holding the battery in the machine to these handles.

It has been customary in connection with hard rubber battery boxes to use metal handles at opposite ends of the box secured by screws passing through the attaching plates and engaging nuts embedded in the rubber of the box, by means of which screws the handle plates have been secured directly to and against the end faces of the boxes. In the shaking and jolting of the motor vehicles when in use, it has been found that the acid comes up through the vent plugs and overflows to the end of the box where it comes in contact with the handle and causes a corroding action, and following the handle down to the screws corrodes them, the corrosion eventually extending into the nut and around the head of the screw to the handle. This makes is difficult to remove the screws for repair or replacement of the handles, and also shortens the life of the handles.

The object of the present invention is to provide a handle construction or means of attachment which will be free from these objections and the invention includes the novel features of construction and arrangement and combination of parts hereinafter described, and particularly defined by the appended claim.

The said invention will be more clearly understood by reference to the accompanying drawings, in which:—

Fig. 1 is a side elevation of a box embodying our invention.

Fig. 2 is an end view.

Fig. 3 is a partial section on line 3—3 of Fig. 2.

Fig. 4 is a similar view of a modification, and

Fig. 5 is a like view of a still further modification.

Referring by reference characters to these drawings, the numeral 1 designates a hard rubber battery jar of the usual construction having embedded in the end walls thereof anchoring means such as nuts 2 which are designed to cooperate with the attaching screws 3 which pass through the handle members 4. In order to avoid the corroding effect of the acid, the handle members are spaced from the end walls of the battery jar or box by interposed acid-proof spacing means so that any seepage of acid may take place down the outside face of the battery box without contact with either the metal handle or the attaching screws, whereby corrosive action is prevented.

One means of accomplishing this is to provide around the screws and between the face of the box and the inner face of the handle, rubber washers as indicated at 5. These washers serve to space the handle members and to protect the screws from any acid seepage.

Instead of using rubber washers as hereinbefore described, we may, in the molding of the box, form the end walls with integral hard rubber bosses, as indicated at 5$^a$, against which the handles are clamped and which serve to space them from the box walls. Where hard rubber bosses are used, we preferably coat the outer faces of the bosses with a rubber cement so that when the screws are tightened up, a hermetically sealed joint is provided between the inner face of the handle and the outer faces of the bosses.

The handles as before described, in addition to serving the function of handles for lifting the box, are adapted to be engaged by the hold-down clamps for holding the battery in place in the motor vehicle.

These hold-down clamps exert a great deal of strain, and to provide a handle which will be strong and yet light, and to distribute the strain so as to prevent any liability of breakage of the end walls of the box, we construct the handle and attach it in the following manner. The handle is constructed of sheet metal, having a body portion of substantially triangular shape with the apex of the triangle pointing downwardly and this body portion is made of a width corresponding to the width of the end walls of the box. The nuts for engagement with the screws through the ends or wings of the handle, are thus embedded in the body of the box near the upper edge in line with the side walls of the box, as shown, so that any force or pressure applied to the grip portions $4^a$ of the handle is sustained by the side walls, and thus the intermediate portions of the end walls are relieved of such outward strain. By extending the central apex portion of the handle body downward to a material distance, the leverage is such that very little pressure is imparted to the end wall by any tendency of the handle to rock on its upper secured screws under the outward pressure referred to. The handle is constructed by stamping up from sheet metal into the proper shape, a portion of the metal being removed to provide upwardly extending members $4^b$ which are connected at their upper ends by the integral handle portion $4^a$ above referred to.

To stiffen the handle members and enable them to be constructed of lighter sheet metal than would otherwise be possible, we provide them with integral cross ribs $4^c$ formed by stamping or dieing up the metal, which cross ribs are in line with the end attaching screws, and we also provide vertical strengthening ribs $4^d$ extending upwardly into the hand grip member carrying portions. The portion of the sheet metal which forms the grip portions is stamped in a curved form, as shown, and small centrally disposed recesses $a$ are provided for securing the attaching clamps.

Instead of embedding nuts in the walls and providing screws to engage therewith, it is obvious that this construction could be reversed as shown in Fig. 5, in which event the anchoring means may be in the form of pin $3^a$ having a flared or pronged head $3^b$ embedded in the box wall, the outer end of the pin passing through the handle opening and being threaded to receive the clamping nut $2^a$.

Having thus described the said invention, what is claimed as new, is:—

The combination with a container formed entirely of acid-proof material, of a pair of rigid sheet metal handles carried thereby, said handles having handle portions adapted to receive the thrust of hold-down devices, and having substantially triangular portions overlying the end walls of the container, metallic securing devices for securing the said triangular portions to the box walls at slightly spaced points, said triangular portions being held spaced from the end walls of the container by acid-proof spacing means surrounding said securing means.

In testimony whereof, we affix our signatures.

ALFRED A. GLIDDEN.
JOSEPH E. PERRAULT.